US011164013B2

(12) United States Patent
Jonasson et al.

(10) Patent No.: US 11,164,013 B2
(45) Date of Patent: *Nov. 2, 2021

(54) METHODS AND SYSTEMS FOR GENERATING AND USING A ROAD FRICTION ESTIMATE BASED ON CAMERA IMAGE SIGNAL PROCESSING

(71) Applicant: Volvo Car Corporation, Gothenburg (SE)

(72) Inventors: Mats Jonasson, Partille (SE); Sohini Roy Chowdhury, Santa Clara, CA (US); Minming Zhao, Mountain View, CA (US); Niklas Ohlsson, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 0 days.

This patent is subject to a terminal disclaimer.

(21) Appl. No.: 16/884,156

(22) Filed: May 27, 2020

(65) Prior Publication Data

US 2020/0285867 A1    Sep. 10, 2020

Related U.S. Application Data

(63) Continuation of application No. 15/969,973, filed on May 3, 2018, now Pat. No. 10,706,294.

(51) Int. Cl.
*G06T 7/11* (2017.01)
*G06K 9/00* (2006.01)
(Continued)

(52) U.S. Cl.
CPC ............ *G06K 9/00798* (2013.01); *B60R 1/00* (2013.01); *G06K 9/4642* (2013.01);
(Continued)

(58) Field of Classification Search
CPC ........... G06K 9/00798; G06K 9/00791; G06K 9/6277; G06K 9/6232; G06K 9/4642;
(Continued)

(56) References Cited

U.S. PATENT DOCUMENTS 9,139,204 B1    9/2015    Zhao et al.
9,598,087 B2    3/2017    Zhao et al.
(Continued)

FOREIGN PATENT DOCUMENTS

EP          3299993 A1      3/2018
JP       2004280339 A      10/2004
(Continued)

OTHER PUBLICATIONS

Ryu, Seung-Ki, Taehyeong Kim, and Eunjoo Bae. "Algorithm and experiment for vision-based recognition of road surface conditions using polarization and wavelet transform." J Emerg Trends Comput Inf Sci 5, No. 10 (2014): 739-745. (Year: 2014).*
(Continued)

*Primary Examiner* — Carol Wang
(74) *Attorney, Agent, or Firm* — Clements Bernard Walker; Christopher L. Bernard

(57) ABSTRACT

Methods and systems for generating and utilizing a road friction estimate (RFE) indicating the expected friction level between a road surface and the tires of a vehicle based on forward looking camera image signal processing. A forward-looking camera image is pre-processed, patch segmented (both laterally and longitudinally, as defined by wheel tracks or the like), transformed into a bird's eye view (BEV) image using perspective transformation, patch quantized, and finally classified. The resulting RFE may be used to provide driver information, automatically control the associated vehicle's motion, and/or inform a cloud-based alert service to enhance driver safety.

20 Claims, 4 Drawing Sheets

(51) Int. Cl.
  *B60R 1/00* (2006.01)
  *G06K 9/46* (2006.01)
  *G06K 9/62* (2006.01)
(52) U.S. Cl.
  CPC ......... *G06K 9/6232* (2013.01); *G06K 9/6277* (2013.01); *G06T 7/11* (2017.01); *B60R 2300/30* (2013.01); *B60R 2300/607* (2013.01); *G06T 2207/30252* (2013.01)
(58) Field of Classification Search
  CPC ............ G06T 7/11; G06T 2207/30252; B60R 2300/607; B60R 2300/30; B60R 1/00
  See application file for complete search history.

(56) References Cited

U.S. PATENT DOCUMENTS

| | | | |
|---|---|---|---|
| 9,598,088 B2* | 3/2017 | Lee | G06K 9/00791 |
| 2015/0178572 A1 | 6/2015 | Omer | |
| 2015/0224925 A1 | 8/2015 | Hartmann | |
| 2015/0371095 A1 | 12/2015 | Hartmann et al. | |
| 2017/0028971 A1* | 2/2017 | Kajiyama | B62L 3/08 |

FOREIGN PATENT DOCUMENTS

| | | |
|---|---|---|
| JP | 3817611 B2 | 9/2006 |
| WO | 2013173911 A1 | 11/2013 |
| WO | 2017053415 A1 | 3/2017 |
| WO | 2017068743 A1 | 4/2017 |
| WO | 2018054910 A2 | 3/2018 |

OTHER PUBLICATIONS

Holzmann, Frederic et al. "Predictive estimation of the road-tire friction coefficient." In 2006 IEEE Conference on Computer Aided Control System Design, 2006 IEEE International Conference on Control Applications, 2006 IEEE International Symposium on Intelligent Control, pp. 885-890. IEEE, 2006. (Year: 2006).*

Zhao, Jiandong, Hongqiang Wu, and Liangliang Chen. "Road surface state recognition based on SVM optimization and image segmentation processing." Journal of Advanced Transportation 2017 (2017). (Year: 2017).*

Raj, Arjun, Dilip Krishna, R. Hari Priya, Kumar Shantanu, and S. Niranjani Devi. "Vision based road surface detection for automotive systems." In 2012 International Conference on Applied Electronics, pp. 223-228. IEEE, 2012. (Year: 2012).*

Sep. 20, 2019 European Search Report issued for International Application No. EP19170536.

* cited by examiner

METHODS AND SYSTEMS FOR GENERATING AND USING A ROAD FRICTION ESTIMATE BASED ON CAMERA IMAGE SIGNAL PROCESSING

CROSS-REFERENCE TO RELATED APPLICATION

The present disclosure is a continuation (CON) of copending U.S. patent application Ser. No. 15/969,973, filed on May 3, 2018, and entitled "METHODS AND SYSTEMS FOR GENERATING AND USING A ROAD FRICTION ESTIMATE BASED ON CAMERA IMAGE SIGNAL PROCESSING," the contents of which are incorporated in full by reference herein.

TECHNICAL FIELD

The present disclosure relates generally to methods and systems for generating and utilizing a road friction estimate (RFE) based on camera image processing in the automotive field. More specifically, the present disclosure relates to methods and systems for generating and utilizing a RFE based on forward looking camera image processing. A forward-looking camera image is pre-processed, patch segmented, transformed into a bird's eye view (BEV) image using perspective transformation, patch quantized, and finally classified for road friction estimation (also RFE). The resulting RFE may be used to provide driver information, automatically control the associated vehicle's motion, and/or inform a cloud-based alert service to enhance driver safety.

BACKGROUND

Various conventional methods and systems exist for determining road surface condition (RSC). Most of these methods and systems rely on analyzing a downward looking camera image, providing information about the road surface directly under a vehicle. Some of these methods and systems rely on focusing a circular light ahead of a vehicle and analyzing a corresponding forward looking camera image, measuring intensity based features such as mean, variance, and maximum pixel intensity within a region of interest (ROI) and implementing probabilistic binary classifiers in order to classify dry, wet, snow, and ice RSCs, optionally followed by a fusion process to generate control parameters for braking, steering, and acceleration sensors. Other of these methods and systems utilize forward looking camera images, transform them into spatial frequency spectra, and analyze the associated frequency distributions corresponding to different RSCs. Still other of these methods and systems utilize forward looking camera images and apply polarization filters and wavelet transformations to classify different RSCs. None of these methods and systems, however, accurately go beyond RSC to generate and use a RFE. This is a fundamental distinction.

RFE estimates the friction level between a road and the tires of a vehicle, across and along the road but especially along the wheel tracks against the surface of the road. Various conventional methods and systems exist for estimating and computing a RFE. However, most of these methods and systems rely on the use of one-dimensional (1-D) on-vehicle sensors, applying physics-based models. These methods generally result in low availability for RFE (typically about 3-5%), resulting in unacceptably low confidence most of the time. In such physics-based models, high confidence occurs only when very significant sliding occurs between the tires and the road. Thus, real time RFEs are sporadic and predictive ability is hampered, diminishing the value of the resulting driver information, delaying and/or limiting automatic control the associated vehicle's motion, and/or falling short of the practical requirements of most cloud-based alert services. This compromises driver safety.

Thus, there is a need for state-of-the-art methods and systems for generating and utilizing a RFE based on forward looking camera images and signal processing for improved accuracy, high availability, and enhanced predictive ability for drivable environmental conditions, while operating efficiently. It will be understood that this background provides and exemplary context and environment in which the methods and systems of the present disclosure are implemented. However, the methods and systems of the present disclosure may be implemented in other contexts and environments equally.

SUMMARY

In various exemplary embodiments, the present disclosure provides methods and systems for generating and utilizing a RFE indicating the expected friction level between a road surface and the tires of a vehicle based on forward looking camera images and signal processing. A forward-looking camera image is pre-processed, patch segmented (both laterally and longitudinally, as defined by wheel tracks or the like), transformed into a BEV image to provide easy-to-process patches of the drivable surface ahead of the vehicle, patch quantized, and finally classified for RFE. The resulting RFE may be used to provide driver information, automatically control the associated vehicle's motion, and/or inform a cloud-based alert service to enhance driver safety. This RFE inherently includes a temporal component that alerts a driver and/or causes a vehicular response to hazardous driving conditions prior to such conditions being encountered by the vehicle and driver. This provides predictive leverage. The methods and systems of the present disclosure may be integrated with the operation of other conventional on-vehicle sensors and systems, such as those providing braking/acceleration, lateral/longitudinal movement, and/or torque control. The methods and systems have improved accuracy, increased availability (even when pronounced tire forces are not present), and enhanced predictive ability, while operating efficiently with relatively low computational complexities as compared to existing image-based RSC classification models.

In one exemplary embodiment, the present disclosure provides a method for generating and utilizing a road friction estimate (RFE) based on vehicle camera image processing, including: obtaining an image of a road surface from a vehicle camera; segmenting the image into a plurality of patches; transforming a perspective of the road surface of the image; quantizing each patch of the plurality of patches to determine a probability of a given road surface friction condition based on an image analysis of each patch of the plurality of patches; classifying groups of the plurality of patches based on their determined probabilities to form a RFE for the road surface; and one or more of: (1) alerting a driver to a road surface friction condition, (2) reporting the road surface friction condition to a vehicle network, and (3) one or more of limiting and modifying a vehicle operational parameter responsive to the generated RFE for the road surface. Preferably, the vehicle camera is a forward-looking vehicle camera and the image is a forward-looking image. Side-looking and composite images may be used equally.

The method also includes pre-processing the image to initially classify the image, wherein certain classifications that may lead to variable RFE are subjected to further processing to more accurately determine the RFE based on the relative wheel position on the road surface and certain classifications that may not lead to variable RFE are not subjected to further processing to more accurately determine the RFE. For instance, images associated with "dry" road surface conditions imply high friction, or high RFE, and hence such images do not need to be subjected to patch segmentation and quantization. However, images associated with "snowy" road surface conditions need to be patch segmented and quantized to ascertain the relative position of the wheel tracks with respect to snow and ice on the drivable surface, which in turn is indicative of road friction experienced by the vehicle. Segmenting the image into the plurality of patches includes segmenting the image into a plurality of rows and columns in front of the vehicle, wherein at least 2 rows and at least 3 columns are utilized. Preferably, wheel tracks present on the road surface are encompassed within two of the plurality of columns. Transforming the perspective of the road surface of the image includes transforming the perspective of the road surface of the image from a forward-looking perspective to an overhead bird's eye view (BEV) perspective. Optionally, segmenting the image into the plurality of patches is performed before transforming the perspective of the image, such that the plurality of patches are also perspective transformed. Quantizing each patch of the plurality of patches to determine the probability of the given road surface friction condition includes extracting a plurality of color/textural features from each patch and assigning a probability score to each patch corresponding to a per-patch composition of each patch. Quantizing each patch of the plurality of patches to determine the probability of the given road surface friction condition further includes combining multiple probability scores to determine a composite probability score for a group of patches. Finally, classifying the groups of the plurality of patches based on their determined probabilities includes assigning each determined probability a classification score and combining multiple classification scores to generate the RFE for the road surface relative to vehicle position.

In another exemplary embodiment, the present disclosure provides a system for generating and utilizing a road friction estimate (RFE) based on vehicle camera image processing, including: a vehicle camera configured to provide an image of a road surface; and a memory storing machine-readable instructions that when executed by a processor cause the system to: segment the image into a plurality of patches; transform a perspective of the road surface of the image; quantize each patch of the plurality of patches to determine a probability of a given road surface friction condition based on an image analysis of each patch of the plurality of patches; classify groups of the plurality of patches based on their determined probabilities to form a RFE for the road surface; and one or more of: (1) alert a driver to a road surface friction condition, (2) report the road surface friction condition to a vehicle network, and (3) one or more of limit and modify a vehicle operational parameter responsive to the generated RFE for the road surface. Preferably, the vehicle camera is a forward-looking vehicle camera and the image is a forward-looking image. Side-looking and composite images may be used equally. The processor further causes the system to pre-process the image to initially classify the image, wherein certain classifications that may lead to variable RFE are subjected to further processing to more accurately determine the RFE based on the relative wheel position on the road surface and certain classifications that may not lead to variable RFE are not subjected to further processing to more accurately determine the RFE. For instance, images associated with "dry" road surface conditions imply high friction, or high RFE, and hence such images do not need to be subjected to patch segmentation and quantization. However, images associated with "snowy" road surface conditions need to be patch segmented and quantized to ascertain the relative position of the wheel tracks with respect to snow and ice on the drivable surface, which in turn is indicative of road friction experienced by the vehicle. Segmenting the image into the plurality of patches includes segmenting the image into a plurality of rows and columns in front of the vehicle, wherein at least 2 rows and at least 3 columns are utilized. Preferably, wheel tracks present on the road surface are encompassed within two of the plurality of columns. Transforming the perspective of the road surface of the image includes transforming the perspective of the road surface of the image from a forward-looking perspective to an overhead bird's eye view (BEV) perspective. Optionally, segmenting the image into the plurality of patches is performed before transforming the perspective of the image, such that the plurality of patches are also perspective transformed. Quantizing each patch of the plurality of patches to determine the probability of the given road surface friction condition includes extracting a plurality of color/textural features from each patch and assigning a probability score to each patch corresponding to a per-patch composition of each patch. Quantizing each patch of the plurality of patches to determine the probability of the given road surface friction condition further includes combining multiple probability scores to determine a composite probability score for a group of patches. Finally, classifying the groups of the plurality of patches based on their determined probabilities includes assigning each determined probability a classification score and combining multiple classification scores to generate the RFE for the road surface relative to vehicle position.

In a further exemplary embodiment, the present disclosure provides a non-transitory computer-readable medium including road friction estimate (RFE) determination instructions stored in a memory and executed by a processor to carry out the steps, including: obtaining an image of a road surface from a vehicle camera; segmenting the image into a plurality of patches; quantizing each patch of the plurality of patches to determine a probability of a given road surface friction condition based on an image analysis of each patch of the plurality of patches; classifying groups of the plurality of patches based on their determined probabilities to generate a RFE for the road surface; and one or more of: (1) alerting a driver to a road surface friction condition, (2) reporting the road surface friction condition to a vehicle network, and (3) one or more of limiting and modifying a vehicle operational parameter responsive to the generated RFE for the road surface. The steps further include transforming a perspective of the image, wherein transforming the perspective of the image includes transforming the perspective of the image from one of a forward-looking perspective and a side-looking perspective to an overhead bird's eye view (BEV) perspective.

BRIEF DESCRIPTION OF THE DRAWINGS

The present disclosure is illustrated and described herein with reference to the various drawings, in which like reference numbers are used to denote like method steps/system components, as appropriate, and in which.

DESCRIPTION OF EMBODIMENTS

Figure 1:
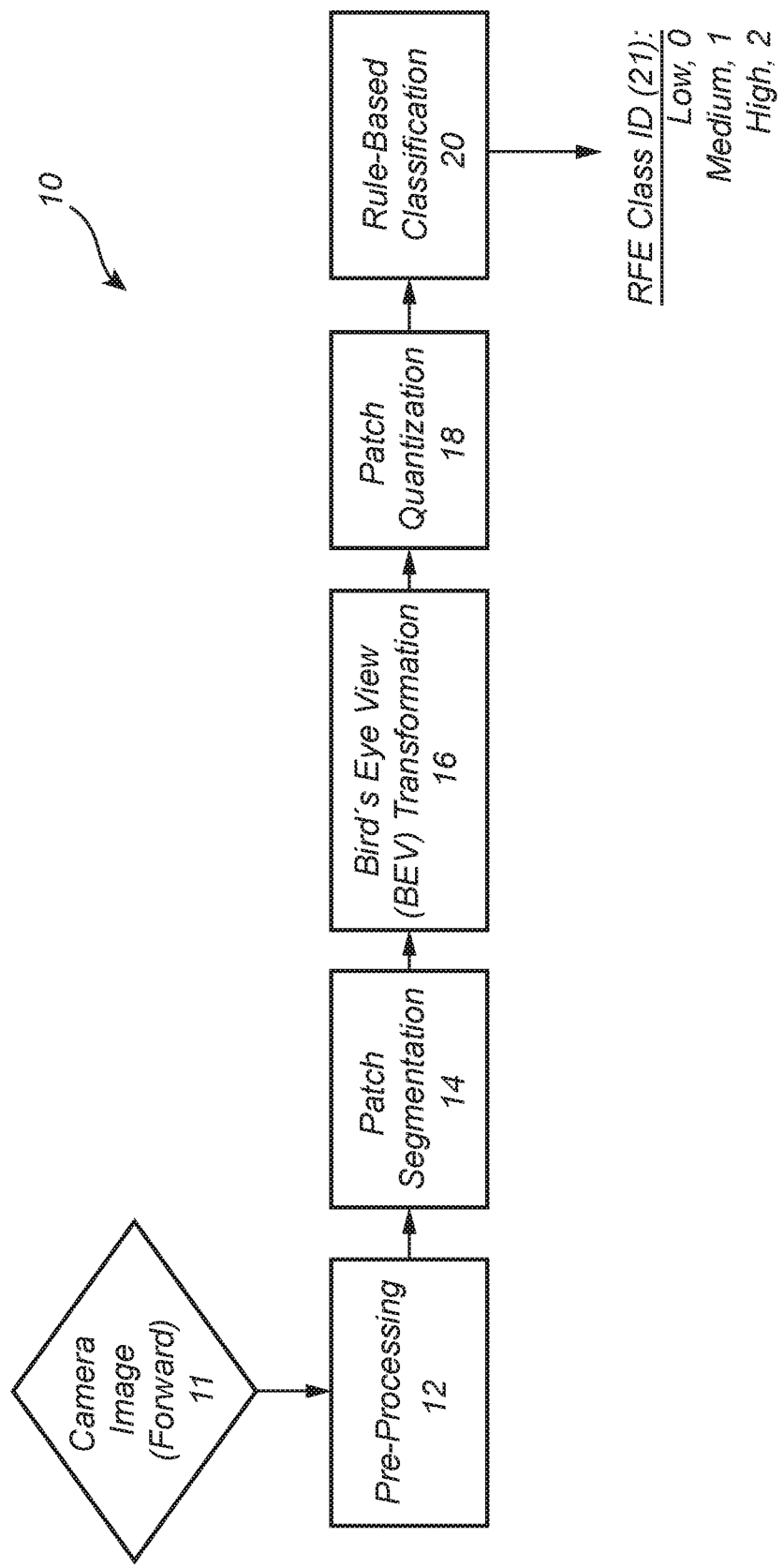
FIG. 1 is a flowchart illustrating one exemplary embodiment of the method for generating a RFE of the present disclosure, including pre-processing, patch segmentation, BEV transformation, patch quantization, and classification steps.

Referring now specifically to FIG. 1, in one exemplary embodiment, the RFE generation method 10 of the present disclosure includes the following steps, each of which is executed by a processor, such as an on-vehicle electronic control unit (ECU) 104 (FIG. 4) or the like: pre-processing 12, patch segmentation 14, BEV transformation 16, patch quantization 18, and classification 20. These steps each operate on an image 11 that is preferably obtained from an on-vehicle forward looking camera 102 (FIG. 4) or the like that has visibility for a given distance in front of a vehicle (not illustrated), for example 50 meters.

The image 11 is first pre-processed. In this pre-processing step 12, the image 11 is broadly classified into a dry/wet/snow/slush/etc. RSC classification may be performed using any novel or conventional methodology known to those of ordinary skill in the art. For example, the image 11 may be classified into a given RSC using a machine learning/deep learning or neural network methodology that analyzes color/texture differences between a road surface, the sky, and the surrounding environment. This helps to remove selected images from further RFE processing. For example, if the image 11 can be immediately classified as "dry," then further patch segmentation, quantization, and classification is not required as all patches are homogeneous and represent a high RFE. An image 11 that is not immediately classifiable as "dry" with a predetermined degree of confidence, for example, advances to further RFE processing.

Figure 2:
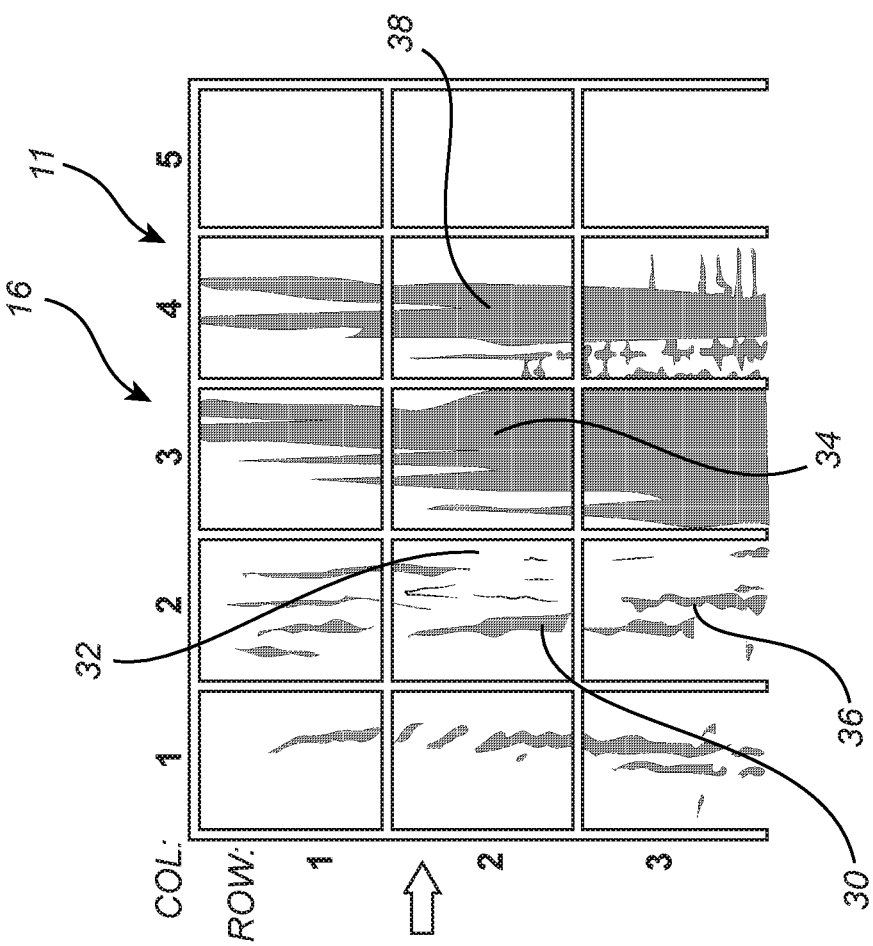
FIG. 2 is a series of images illustrating exemplary embodiments of the patch segmentation and BEV transformation steps of the method for generating a RFE of the present disclosure, respectively.
Figure 2:
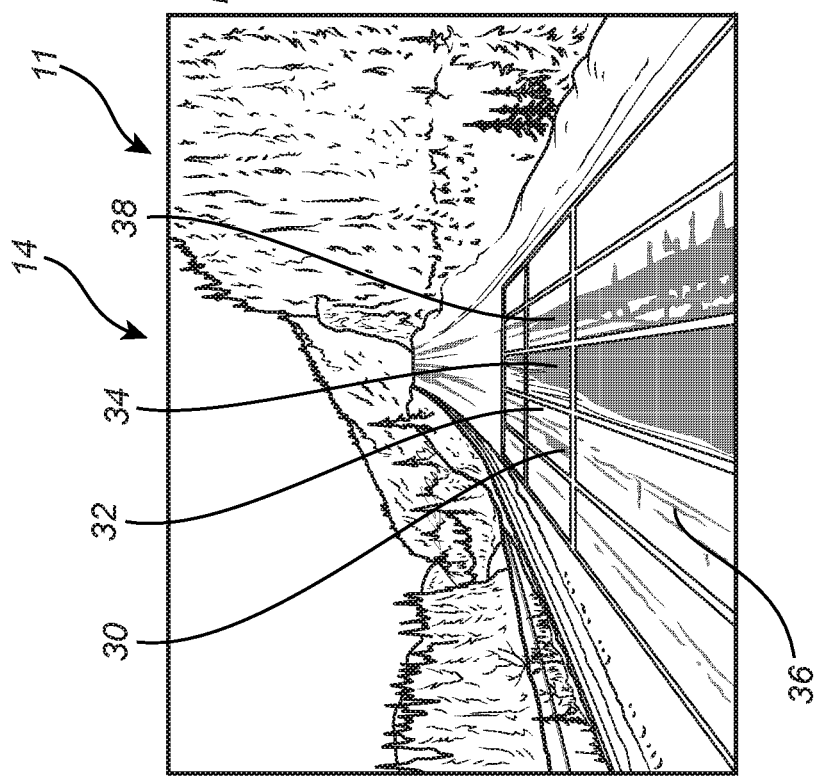

The pre-processed image 11 is next patch segmented, as illustrated in FIG. 2. In this patch segmentation step 14, the image 11, and specifically the road surface depicted in the image 11, is divided into discrete regions via lateral (i.e., horizontal) lines 30 and longitudinal (i.e., vertical) lines 32, forming an m×n patch matrix 34 over the road surface. Because the image 11 is obtained from a forward-looking camera 102 (FIG. 4), it is a perspective image 11 with a vanishing point. Accordingly, the lateral lines 30 are substantially parallel, while the longitudinal lines 32 generally converge with distance from the camera 102. In this exemplary embodiment, a 5×3 patch matrix 34 is illustrated and used, although it will be readily apparent to those of ordinary skill in the art that other numbers of patches 36 (columns and rows) may be used equally. In this 5×3 patch matrix 34, columns 2 and 4 are configured to substantially correspond to and encompass the wheel tracks 38 depicted, while column 3 is configured to be substantially between the wheel tracks 38 depicted. Per U.S. convention, column 1 is adjacent to the oncoming traffic lanes and column 5 is adjacent to the shoulder. It is important, although not absolutely required, that enough rows are utilized to provide a temporal dimension to the generated RFE, with the image 11 depicting and sufficiently analyzing enough road surface that the vehicle has yet to encounter. Again, at least a 3×2 patch matrix 34 is preferred, with each patch 36 covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix 34 provides 30-50 m of RFE distance. It should be noted that the image 11 may be a stitched image obtained from multiple cameras 102 without substantially altering the processing steps described herein.

The pre-processed, patch segmented image 11 is next perspective transformed, as again illustrated in FIG. 2. In this perspective transformation step 16, the image 11, and specifically the road surface depicted in the image 11, already divided into discrete regions via lateral (i.e., horizontal) lines 30 and longitudinal (i.e., vertical) lines 32, forming an m×n patch matrix 34 over the road surface, is converted into an overhead, BEV image 11. Because the image 11 is originally obtained from a forward-looking camera 102 (FIG. 4), it is a perspective image 11 with a vanishing point. Accordingly, the lateral lines 30 are substantially parallel, while the longitudinal lines 32 generally converge with distance from the camera 102. As a result, pixel contributions proximate to the camera 102 in the image 11 are enhanced, while pixel contributions remote from the camera 102 in the image 11 are diminished. In the BEV transformed image 11, both the lateral lines 30 and the longitudinal lines 32 are substantially parallel, and perpendicular to one another. This promotes processing efficiency and equalizes pixel contributions. Again, in this exemplary embodiment, a 5×3 patch matrix 34 is illustrated and used, although it will be readily apparent to those of ordinary skill in the art that other numbers of patches 36 (columns and rows) may be used equally. In this now "rectified" 5×3 patch matrix 34, columns 2 and 4 are still configured to substantially correspond to and encompass the wheel tracks 38 depicted, while column 3 is still configured to be substantially between the wheel tracks 38 depicted. Per U.S. convention, column 1 is still adjacent to the oncoming traffic lanes and column 5 is still adjacent to the shoulder. Again, it is important, although not absolutely required, that enough rows are utilized to provide a temporal dimension to the generated RFE, with the BEV transformed image 11 depicting and sufficiently analyzing enough road surface that the vehicle has yet to encounter. Again, at least a 3×2 patch matrix 34 is preferred, with each patch 36 covering 1-2 m laterally and 10-15 m longitudinally, for example—providing adequate and variable road surface coverage and the aforementioned temporal dimension. Different camera fields-of-view, resolutions, and calibrations could dictate/allow for other dimensions to be utilized equally. Typically, the 5×3 patch matrix 34 provides 30-50 m of RFE distance. It should be noted that the BEV transformed image 11 may be a stitched image obtained from multiple cameras 102 without substantially altering the processing steps described herein. In practice, the above patch segmentation 14 may be applied before or after the BEV transformation 16, provided the same image hallmarks (e.g., the wheel tracks 38) are used.

Figure 3:
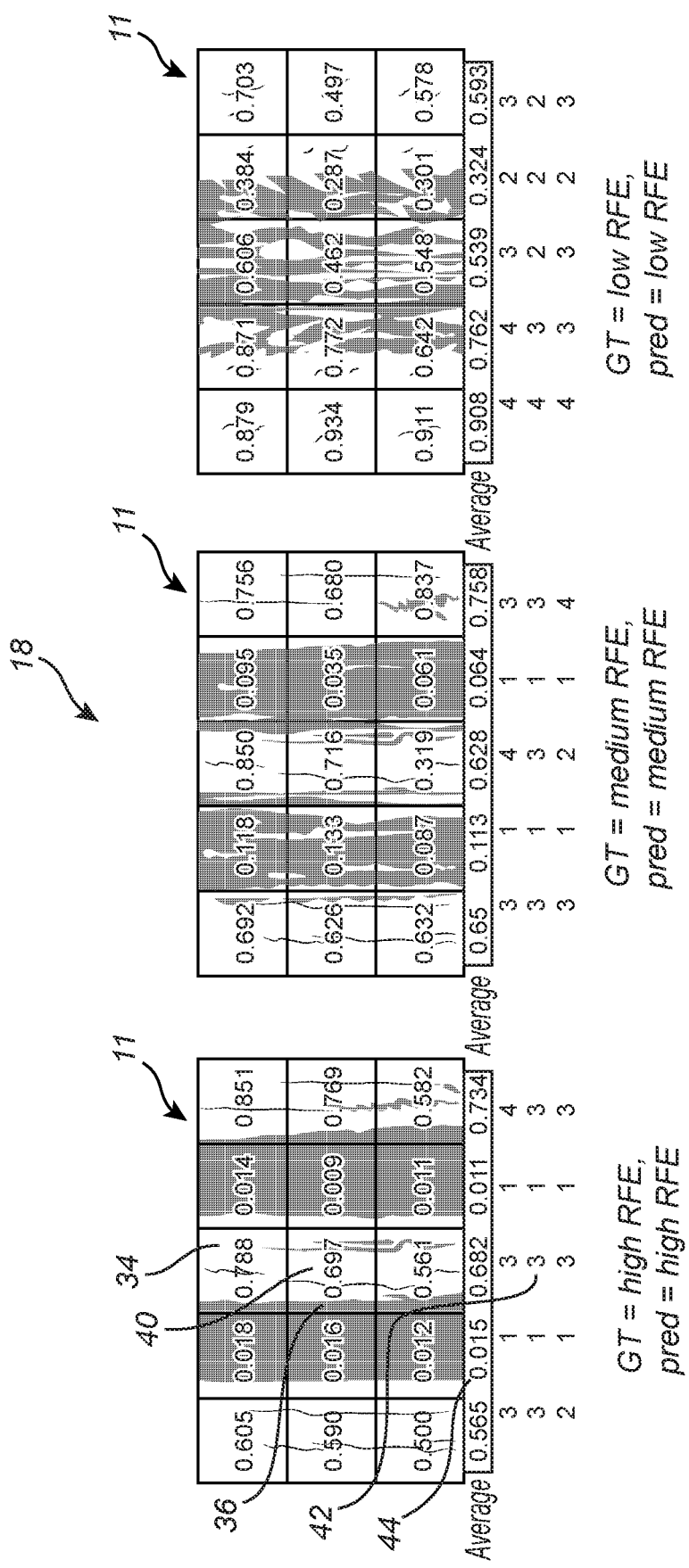
FIG. 3 is a series of images illustrating one exemplary embodiment of the patch quantization step of the method for generating a RFE of the present disclosure, highlighting a well ploughed (high friction) road surface, a partially snow covered/patchy (medium friction) road surface, and a substantially snow covered/patchy (low friction) road surface.

The pre-processed, patch segmented, BEV transformed image 11 is next patch quantized, as illustrated in FIG. 3. In this patch quantization step 18, a probability score 40 is determined for each patch 36 and then each probability score 36 is assigned one of a predetermined number of corresponding levels 42. The probability score 40 is determined for each patch 36 by extracting a plurality (e.g., 26) color and textural features from that patch 36. Exemplary color and textural features include, but are not limited to, the mean and standard deviation of pixel intensities in the [R,G,B,H,S,V] planes with and without contrast enhancement and the mean and standard deviation of the HOG features extracted using a [16×16] block size, for example. Such methodologies are well known to those of ordinary skill in the art. This probability score determination outputs a probability score (p_i) 40 corresponding to the per-patch composition. A low probability score 40 indicates a "dry" patch 36, while a high probability score 40 indicates a "snowy" patch 36. Many methodologies could be used to generate these probability scores 36, such as a machine learning methodology, a logistic regression methodology, SVM, a neural network methodology, etc. Next, the probability scores 40 are each assigned one of a predetermined number of corresponding levels 42 (e.g., 4) based on thresholds $\{0, th_1, th_2, th_3, 1\}$ that can be empirically or experimentally determined. For example:

$s_i =$
1; $0 \leq p_i \leq th_1$; =>dry;
2; $th_1 \leq p_i \leq th_2$; =>more dry, less snow;
3; $th_2 \leq p_i \leq th_3$; =>more snow, less dry;
4; $th_3 \leq p_i \leq 1$; =>snow;

Thus, a lower probability score means a less snowy and drier patch in this construct. An "ice" patch would be identified as $s_i = [2,3]$. These patch quantization thresholds are empirically determined to maximize patch classification accuracy. Averages 44 may also be computed for groups of patches 36, such as each column (as illustrated). A weighted average, mean, median, or the like could also be used to provide temporal distribution information, enabled by the use of multiple rows. It will be readily apparent to those of ordinary skill in the art that other classification schemes may be used equally.

Now that each patch 36 has a classified probability score, a classification step 20 (FIG. 1), such as a rule-based classification step, for example, is utilized in which a uniform friction value, the RFE, is formulated for the entire road surface depicted in the pre-processed, patch segmented, BEV transformed, patch quantized image 11. One exemplary rule, when rules are used, is based on calculating the weighted of all columns (1-5) of the matrix 34. For example, the uniform friction, $RFE_j$, =2 (i.e., high MUE) if the count of column average probability $<=th_1$ is greater than 2. $RFE_j$, =1 (i.e., medium MUE) if the count of column average probability $<=th_2$ and $>th_1$ is greater than 2. $RFE_j$, =0 (i.e., low MUE) otherwise. It will be readily apparent to those of ordinary skill in the art that any classification methodology can be utilized equally, and all threshold values can be learned from larger training images/image sets using decision tree-based models and the like.

It should further be noted that, given a forward-looking camera 102 (FIG. 4) in a vehicle, not every image frame has to be processed to obtain an accurate and useful RFE. For example, with a logging frame rate of about 30 frames per second, image frames may be processed every 3 or 4 seconds. This promotes processing efficiency. Further, patches 36 (FIGS. 2 and 3) may be adaptive, adjusting to changing road surface sizes, orientations, and conditions. Importantly, the RFEs generated should be suitable for use for vehicle control systems and cloud uploading once generated.

Figure 4:
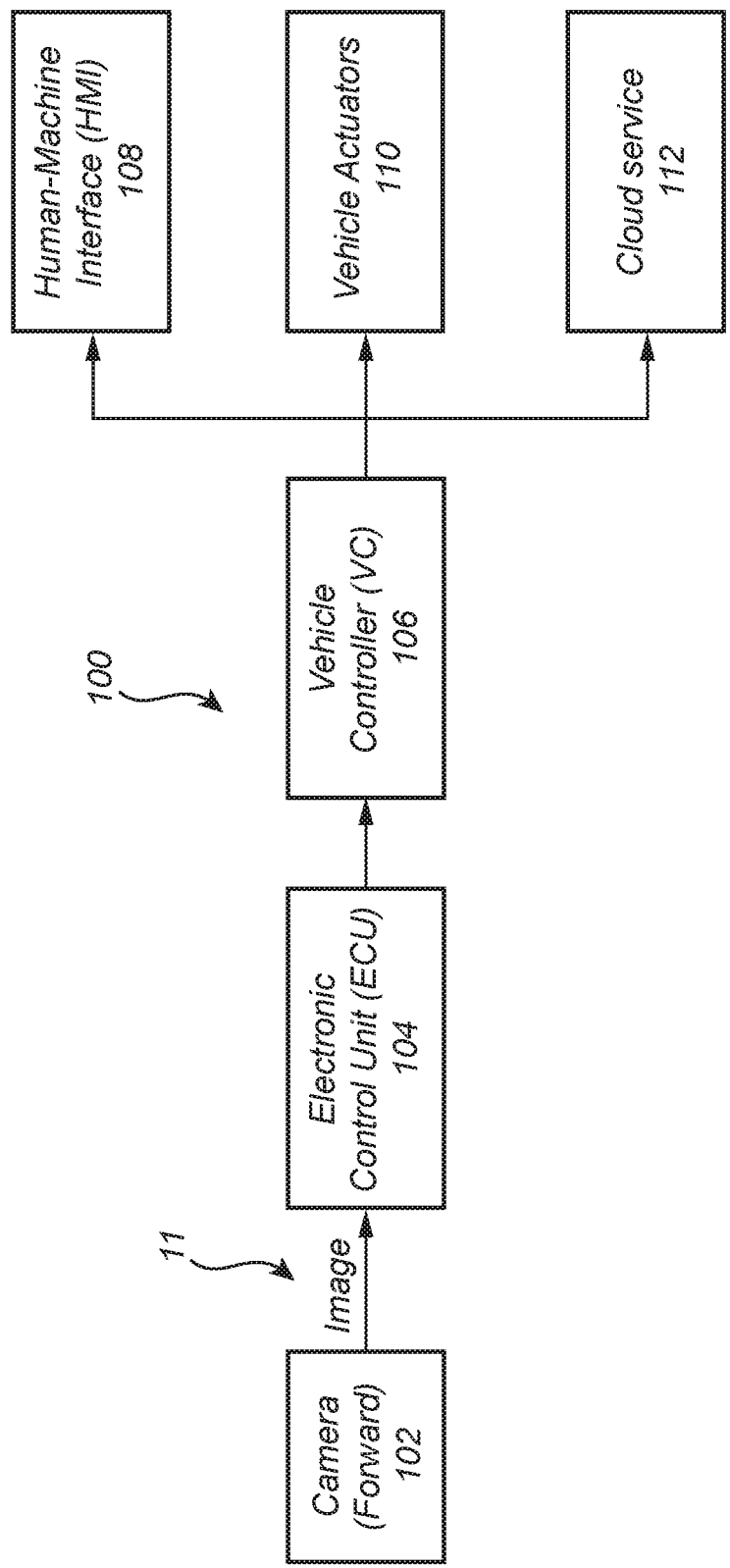
FIG. 4 is a schematic diagram illustrating one exemplary embodiment of the system for generating a RFE of the present disclosure, as implemented in a vehicle.

Referring now specifically to FIG. 4, in one exemplary embodiment, the system for generating the RFE 100 includes the forward-looking camera 102 described herein above, well known to those of ordinary skill in the art. The forward-looking camera image 11 is transmitted from the forward-looking camera 102 to the electronic control unit (ECU) 104 of the vehicle, where the above describe processing of the forward-looking camera image 11 takes place. This ECU 104 is well known to those of ordinary skill in the art and includes appropriate memory and a processor operable for executing the software application of the present disclosure. The ECU 104 communicates with and coordinates the operation of the vehicle controller (VC) 106, which controls the driver alert, cloud reporting, and system actuation functions of the vehicle. For example, a low RFE condition may trigger a "slippery road ahead" warning to a driver through a human-machine interface (HMI) 108, such as a display screen disposed in the vehicle. A low RFE condition may also cause a "slippery road condition" to be tagged in the cloud 112, such that this information is available to other drivers/vehicles in the area. Finally, a low RFE condition may be communicated to other conventional on-vehicle sensors and control systems/actuators 110, such as those providing braking/acceleration, lateral/longitudinal movement, and/or torque control. This may then provide a driver assist or autonomous driving functionality. For example, the low RFE condition may trigger automatic braking/deceleration such that a safe driving speed is maintained for the conditions present.

Preferably, the software application of the present disclosure is implemented as coded instructions stored in a memory and executed by a processor. The processor is a hardware device for executing such coded instructions. The processor can be any custom made or commercially available processor, a central processing unit (CPU), an auxiliary processor among several processors associated with the memory, a semiconductor-based microprocessor (in the form of a microchip or chip set), or generally any device for executing coded instructions. The processor is configured to execute software stored within the memory, to communicate data to and from the memory, and to generally control operations pursuant to the coded instructions. In an exemplary embodiment, the processor may include a mobile optimized processor, such as one optimized for power consumption and mobile applications. I/O interfaces can be used to receive user input and/or for providing system output. User input can be provided via, for example, a keypad, a touch screen, a scroll ball, a scroll bar, buttons, and/or the like. System output can be provided via a display device, such as a liquid crystal display (LCD), touch screen, and/or the like. The I/O interfaces can also include, for example, a serial port, a parallel port, a small computer system interface (SCSI), an infrared (IR) interface, a radio frequency (RF) interface, a universal serial bus (USB) interface, and/or the like. The I/O interfaces can include a GUI that enables a user to interact with the memory. Additionally, the I/O interfaces may further include an imaging device, i.e. camera, video camera, etc., as described herein above.

The memory may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory may incorporate electronic, magnetic, optical, and/or other types of storage media. Note that the memory may have a distributed architecture, where various components are situated remotely from one another, but can be accessed by the processor. The software in memory can include one or more software programs, each of which includes an ordered listing of executable instructions for implementing logical functions. The software in the memory includes a suitable operating system (O/S) and programs. The operating system essentially controls the execution of other computer programs, and provides scheduling, input-output control, file and data management, memory management, and communication control and related services. The programs may include various applications, add-ons, etc. configured to provide end user functionality. The programs can include an application or "app" which provides various functionalities.

Thus, the present disclosure provides methods and systems for generating and using a RFE indicating the expected friction level between a road surface and the tires of a vehicle based on forward looking camera image signal processing. As described herein above, a forward-looking camera image is pre-processed, patch segmented (both laterally and longitudinally, as defined by wheel tracks or the like), transformed into a BEV image to provide easy-to-process parallel and perpendicular lines, patch quantized, and finally classified. A uniform friction level is estimated that provides a lump friction estimate for the road. The resulting RFE may be used to provide driver information, automatically control the associated vehicle's motion, and/or inform a cloud-based alert service to enhance driver safety. This RFE inherently includes a temporal component that alerts a driver and/or causes a vehicular response to hazardous driving conditions prior to such conditions being encountered by the vehicle and driver. This provides predictive leverage. The methods and systems of the present disclosure may be integrated with the operation of other conventional on-vehicle sensors and systems, such as those providing braking/acceleration, lateral/longitudinal movement, and/or torque control. The methods and systems have improved accuracy, high availability (even when pronounced tire forces are not present), and enhanced predictive ability, while operating efficiently and inexpensively.

Although the present disclosure is illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following non-limiting claims for all purposes.

What is claimed is:

1. A method, comprising:
    obtaining an image of a road surface from a vehicle camera;
    segmenting the image into a plurality of patches;
    quantizing each patch of the plurality of patches to determine a probability of a given road surface friction condition based on an image analysis of each patch of the plurality of patches;
    classifying groups of the plurality of patches based on their determined probabilities to generate a road friction estimate (RFE) for the road surface; and
    one or more of: alerting a driver to a road surface friction condition, reporting the road surface friction condition to a vehicle network, and one or more of limiting and modifying a vehicle operational parameter responsive to the generated RFE for the road surface.

2. The method of claim 1, wherein the vehicle camera is one or more of a forward-looking vehicle camera and a side-looking vehicle camera and the image is one of a forward-looking image, a side-looking image, and a composite image.

3. The method of claim 1, further comprising pre-processing the image to initially classify the image, wherein certain classifications are subjected to further processing to more accurately determine the RFE and certain classifications are not subjected to further processing to more accurately determine the RFE.

4. The method of claim 1, wherein segmenting the image into the plurality of patches comprises segmenting the image into a plurality of rows and columns in front of the vehicle, wherein at least 2 rows and at least 3 columns are utilized.

5. The method of claim 1, further comprising transforming a perspective of the image, wherein transforming the perspective of the image comprises transforming the perspective of the image from one of a forward-looking perspective and a side-looking perspective to an overhead bird's eye view (BEV) perspective.

6. The method of claim 5, wherein segmenting the image into the plurality of patches is performed before transforming the perspective of the image, such that the plurality of patches are also perspective transformed.

7. The method of claim 1, wherein quantizing each patch of the plurality of patches to determine the probability of the given road surface friction condition comprises extracting a plurality of color or textural features from each patch and assigning a probability score to each patch corresponding to a per-patch composition of each patch.

8. The method of claim 7, wherein quantizing each patch of the plurality of patches to determine the probability of the given road surface friction condition further comprises combining multiple probability scores to determine a composite probability score for a group of patches.

9. The method of claim 1, wherein classifying the groups of the plurality of patches based on their determined probabilities comprises assigning each determined probability a classification score and combining multiple classification scores to generate the RFE for the road surface.

10. A system, comprising:
    a vehicle camera configured to provide an image of a road surface; and
    a memory storing machine-readable instructions that when executed by a processor cause the system to:
        segment the image into a plurality of patches;
        quantize each patch of the plurality of patches to determine a probability of a given road surface friction condition based on an image analysis of each patch of the plurality of patches;
        classify groups of the plurality of patches based on their determined probabilities to generate a road friction estimate (RFE) for the road surface; and
        one or more of: alert a driver to a road surface friction condition, report the road surface friction condition to a vehicle network, and one or more of limit and modify a vehicle operational parameter responsive to the generated RFE for the road surface.

11. The system of claim 10, wherein the vehicle camera is one or more of a forward-looking vehicle camera and a side-looking vehicle camera and the image is one of a forward-looking image, a side-looking image, and a composite image.

12. The system of claim 10, wherein the processor further causes the system to pre-process the image to initially classify the image, wherein certain classifications are subjected to further processing to more accurately determine the RFE and certain classifications are not subjected to further processing to more accurately determine the RFE.

13. The system of claim 10, wherein segmenting the image into the plurality of patches comprises segmenting the image into a plurality of rows and columns in front of the vehicle, wherein at least 2 rows and at least 3 columns are utilized.

14. The system of claim 10, wherein the machine-readable instructions are further executed by the processor to cause the system to transform a perspective of the image, wherein transforming the perspective of the image comprises transforming the perspective of the image from one of a forward-looking perspective and a side-looking perspective to an overhead bird's eye view (BEV) perspective.

15. The system of claim 14, wherein segmenting the image into the plurality of patches is performed before transforming the perspective of the image, such that the plurality of patches are also perspective transformed.

16. The system of claim 10, wherein quantizing each patch of the plurality of patches to determine the probability of the given road surface friction condition comprises extracting a plurality of color or textural features from each patch and assigning a probability score to each patch corresponding to a per-patch composition of each patch.

17. The system of claim 16, wherein quantizing each patch of the plurality of patches to determine the probability of the given road surface friction condition further comprises combining multiple probability scores to determine a composite probability score for a group of patches.

18. The system of claim 10, wherein classifying the groups of the plurality of patches based on their determined probabilities comprises assigning each determined probability a classification score and combining multiple classification scores to generate the RFE for the road surface.

19. A non-transitory computer-readable medium comprising road friction estimate (RFE) determination instructions stored in a memory and executed by a processor to carry out the steps, comprising:
   obtaining an image of a road surface from a vehicle camera;
   segmenting the image into a plurality of patches;
   quantizing each patch of the plurality of patches to determine a probability of a given road surface friction condition based on an image analysis of each patch of the plurality of patches;
   classifying groups of the plurality of patches based on their determined probabilities to generate a RFE for the road surface; and
   one or more of: alerting a driver to a road surface friction condition, reporting the road surface friction condition to a vehicle network, and one or more of limiting and modifying a vehicle operational parameter responsive to the generated RFE for the road surface.

20. The non-transitory computer-readable medium of claim 19, wherein the steps further comprise transforming a perspective of the image, wherein transforming the perspective of the image comprises transforming the perspective of the image from one of a forward-looking perspective and a side-looking perspective to an overhead bird's eye view (BEV) perspective.

\* \* \* \* \*